United States Patent
Bhatnagar et al.

(10) Patent No.: US 10,902,140 B2
(45) Date of Patent: Jan. 26, 2021

(54) SERVICES PLATFORM FOR MANAGING A VERIFIABLE PERMISSIONED LEDGER IN A DISTRIBUTED DATABASE MANAGEMENT SYSTEM

(71) Applicant: CBRE, Inc., Los Angeles, CA (US)

(72) Inventors: Avneesh Bhatnagar, Plano, TX (US); Riaz Mohamed Vellamparambil, Frisco, TX (US)

(73) Assignee: CBRE, Inc., Los Angeles, CA (US)

( * ) Notice: Subject to any disclaimer, the term of this patent is extended or adjusted under 35 U.S.C. 154(b) by 210 days.

(21) Appl. No.: 16/011,613

(22) Filed: Jun. 18, 2018

(65) Prior Publication Data

US 2019/0384927 A1 Dec. 19, 2019

(51) Int. Cl.
G06F 21/62 (2013.01)
G06F 21/60 (2013.01)
H04L 9/06 (2006.01)
G06F 16/23 (2019.01)

(52) U.S. Cl.
CPC ...... *G06F 21/6218* (2013.01); *G06F 16/2365* (2019.01); *G06F 16/2379* (2019.01); *G06F 21/602* (2013.01); *H04L 9/0637* (2013.01)

(58) Field of Classification Search
CPC .............. G06F 21/6218; G06F 21/602; G06F 16/2379; G06F 16/2365
See application file for complete search history.

(56) References Cited

U.S. PATENT DOCUMENTS

| | | | |
|---|---|---|---|
| 9,794,074 B2 | 10/2017 | Toll et al. | |
| 10,586,062 B1 * | 3/2020 | Rangan | G06F 21/6209 |
| 2001/0039506 A1 * | 11/2001 | Robbins | G06Q 40/02 705/7.34 |
| 2017/0177898 A1 * | 6/2017 | Dillenberger | G06F 16/2379 |
| 2017/0206603 A1 | 7/2017 | Al-Masoud | |
| 2017/0323392 A1 * | 11/2017 | Kasper | H04L 63/123 |
| 2017/0344987 A1 | 11/2017 | Davis | |
| 2018/0018723 A1 * | 1/2018 | Nagla | H04L 63/08 |
| 2019/0042620 A1 * | 2/2019 | Garagiola | G06F 16/2379 |

(Continued)

FOREIGN PATENT DOCUMENTS

WO  WO2017/173399 A1  10/2017

OTHER PUBLICATIONS

Higgins, ABN Amro Tests Blockchain for Real Estate Transactions, www.coindesk.com, Dec. 16, 2016, 4 pages, CoinDesk.

(Continued)

*Primary Examiner* — Vance M Little
(74) *Attorney, Agent, or Firm* — Almanac IP Advisors LLP (57) ABSTRACT

Embodiments of the disclosure provide an endorsed value in a permissioned ledger in a DDBMS. The permissioned ledger includes entries, each comprising a key and at least one value. Permission is required for a peer node to access the ledger. Digital transactions may only be appended to the ledger. Each peer node maintains at least a portion of a replica of the ledger. A request for valuation of an object is received. A candidate object value of the object is obtained. An endorsed object value of the object is obtained based upon a consensus protocol among peer nodes in the network. A data block is added to the ledger including the endorsed object value, where the added data block is cryptographically linked to a previous data block.

36 Claims, 7 Drawing Sheets

(56) References Cited

U.S. PATENT DOCUMENTS

| | | | | |
|---|---|---|---|---|
| 2019/0058592 A1* | 2/2019 | Wright | ............... | G06Q 20/3827 |
| 2019/0166133 A1* | 5/2019 | Frederick | .............. | H04L 63/061 |
| 2019/0229911 A1* | 7/2019 | Allen | ...................... | H04W 4/70 |
| 2019/0243572 A1* | 8/2019 | Kursun | ................. | G06F 3/0632 |
| 2019/0334912 A1* | 10/2019 | Sloane | ................ | G06F 21/6218 |
| 2020/0012763 A1* | 1/2020 | Arngren | ................ | H04L 9/0825 |
| 2020/0139984 A1* | 5/2020 | Ronnow | ................ | G08G 1/163 |

OTHER PUBLICATIONS

Glossary—hyperledger-fabricdocs master documentation, https://hyperledger-fabric.readthedocs.io/en/release-1.1/glossary.html, retrieved on or before Apr. 11, 2018, 7 pages.

Introduction, hyperledger-fabricdocs master documentation, retrieved on or before Apr. 11, 2018, 9 pages.

Ledger, hyperledger-fabricdocs master documentation, retrieved on or before Apr. 11, 2018, 2 pages.

Blockchain in commercial real estate, copyright 2017, 30 pages, Deloitte Center for Financial Services.

Spielman, Blockchain: Digitally Rebuilding the Real Estate Industry, Sep. 2016, MIT Masters Thesis, 78 pages.

International Search Report, PCT/US2019/037401, dated Aug. 30, 2019, 3 pages, PCT.

Written Opinion of the International Searching Authority, PCT/US2019/037401, dated Aug. 30, 2019, 8 pages, PCT.

\* cited by examiner

SERVICES PLATFORM FOR MANAGING A VERIFIABLE PERMISSIONED LEDGER IN A DISTRIBUTED DATABASE MANAGEMENT SYSTEM

BACKGROUND

Field of the Disclosure

This disclosure relates to the field of distributed database management systems (DDBMS), and more particularly to increasing verifiability and security with respect to transactions recorded in the database.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The transactional networks of today are little more than slightly updated versions of networks that have existed since business records have been kept. The members of a business network transact with each other, but they often maintain separate records of their transactions within their own databases. For example, today's real estate valuation data is stored in a fragmented, non-deterministic environment with multiple parties holding all or a portion of the information related to the value of a property. There is no concept of a "relying party" to enforce the value of a property. The security of information regarding transactions that may affect property value is not guaranteed. Due to the nature and sensitivity of valuation data, providers of valuation services are prone to litigation and the higher costs of operations due to such concerns.

For example, a valuation provider may provide real estate valuation services for a property. Associated with the property may be many parameters, such as market value, square footage and encumbrances such as liens. Conventionally, users may query a database for information such as property valuation. However, later, even many years later, a dispute, may arise concerning the property value. Accusations may be made that unauthorized transactions were made with respect to the property.

Also, transaction records are subject to human error or differences in interpretation. For example, a real estate appraiser may value a commercial property using one of a variety of approaches, e.g., based on comparables. A property investment fund may solicit investors based upon the appraised value. The local economy may suffer a downturn and the property may no longer attract sufficient rent to pay the mortgage, leading to default. The investors may later learn that the mortgage bank used a different approach to valuing the property, leading to a substantially different valuation. Conventionally, there is little transparency that would allow the investors to see the different appraisals. In the end, the investors may initiate litigation against the fund and the appraiser.

One conventional solution is to store in a database all information relevant to the property, including the transaction history, and allow access to interested parties, such as investors and potential investors. However, database entries are susceptible to modification. The database administrator may grant different privileges to different parties, and enforce different policies with respect to data modification by parties with write privileges. However, experience shows that enforcing these privileges and policies over the many years of a property's lifespan is extraordinarily difficult.

SUMMARY OF THE DISCLOSURE

Embodiments of the disclosure provide systems, methods and non-transitory computer-readable media storing instructions for providing an endorsed value in a (key, value) data structure in a permissioned ledger in a distributed database management system (DDBMS) in a network. Embodiments maintain a permissioned ledger in the DDBMS, wherein the ledger requires permission to access and comprises valuation entries, each comprising a key and at least one value. In embodiments of the disclosure, the ledger maintains a record of digital transactions, wherein each digital transaction record may only be appended to the ledger. A transaction is any proposed change to the ledger. In embodiments of the disclosure, each peer node of a plurality of peer nodes maintains at least a portion of a replica of the ledger.

Embodiments of the disclosure receive a request for valuation of an object, wherein the object is identified by an object identifier; generate a candidate object value of the object; implement a consensus protocol among peer nodes in the network concerning the candidate object value to determine an endorsed object value of the object; and add to the ledger a data block that includes the endorsed object value and that is crptographically linked to (e.g., by including a hash of) a previous data block in the ledger.

The endorsed object value is "immutable" in that, e.g., data blocks may only be appended to the ledger, the endorsed object value may be added to the ledger only upon consensus, and the data block storing the endorsed object value is cryptographically linked to a subsequent data block in the ledger, thereby cryptographically linking it to all subsequent data blocks in the ledger, according to embodiments of the disclosure. The cryptographic linkage may be accomplished by storing a hash of the data block in the subsequent data block, which itself has its hash stored in the next data block, and so on.

Embodiments of the disclosure provide service templates for enabling different types of interaction with the ledger. In embodiments of the disclosure, the ledger is implemented using blockchain. In embodiments of the disclosure, the object identifier comprises a public key.

In embodiments of the disclosure, implementing a consensus protocol comprises, if a consensus is not reached among the peer nodes, an originating peer node determining the endorsed object value. In such embodiments, the originating peer node may determine the endorsed object value if a consensus is not reached among the peer nodes after a threshold number of iterations.

Embodiments of the disclosure may also receive from a requestor node a query for an endorsed object value of a first object; provide to the requestor node the requested endorsed object value; receive from the requestor node a requestor endorsement of the requested endorsed object value; and associate, in the permissioned ledger, the requestor node's endorsement with the first object. The requestor endorsement in the ledger provides a source of proof that makes it nearly impossible for the requestor to later dispute the veracity of the requestor's endorsement, thus mitigating the risk of a dispute later arising.

In embodiments of the disclosure, the requestor node is not a peer node permitted to participate in the consensus protocol. In embodiments of the disclosure, the peer nodes are allowed to participate in the consensus protocol by invitation only. In embodiments of the disclosure, the object is real property, and the endorsed object value is a valuation of the real property.

Embodiments of the disclosure establish a channel of a plurality of channels between a client node and a set of the peer nodes, wherein each channel corresponds to a service and to access privileges that peer nodes have with respect to the ledger via the channel. Embodiments of the disclosure verify an ID received from a client node as corresponding to an object referenced in the ledger; retrieve from the ledger requested information requested by the client node with respect to the object identified by the verified ID; and record in the valuation ledger a history of the retrieval of the requested information. Embodiments may record in the ledger a history of other actions, such as creation, updating or deletion of a valuation entry.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

A traditional database platform can potentially be made as a shared instance among multiple peers. In such an environment, there is increased susceptibility to hacking and a potential compromise to security. Also, each enterprise may have different notions of the idea of privacy. Eventually, maintaining such a centralized instance will be highly complex and cost prohibitive, with increased reliance on the shared human organization to manage such an instance. Over a period of time, most organizations will undergo changes in staffing organizations, privacy policies and approaches to classification of data. Tracking such changes in a central instance is also susceptible to errors and contention. In environments such as property valuation where there are multiple parties, each with a different view of the overall data (e.g., an appraiser may only look at the current value for a shorter period of time, while a financial institution looks at current and projected values over a longer period of time), it is extremely difficult to build these views into a central instance. A centralized ledger based on the same concept would also be susceptible to similar constraints.

In order to be made immutable, a centralized ledger would require sequence of ownership, integrity of storage, and auditing of any changes being made to it. Even with centrally maintained passwords, there is no guaranteed or deterministic way to ensure that a peer has changed a certain type of record due to legitimate intent or instead due to malice. In fact, it is technically and algorithmically complex to maintain an immutable record between parties with limited overall trust with each other (e.g., the valuation provider and a competitor)

Finally, if a centralized ledger were to be somehow created with enough security mechanisms in place with a complex sequence of multiple phase commits, the backup and failover implementations of such a ledger across multiple regions to ensure reliability is extremely cost prohibitive and technically inefficient.

According to embodiments of the disclosure, a permissioned distributed ledger within a closed network of peers along with an ecosystem of consensus mechanisms and peer endorsement mechanisms allows for an elegant and cost-effective solution to the above problems. While an originating peer may still be responsible for the creation and maintenance of such a network, consensus protocols allow every peer to participate in any changes to the underlying ledger (data store) in a more decentralized manner. This reduces the complexity of maintaining a central data store and thus the costs of the solution are also reduced.

Moreover, within this ecosystem, more complex interactions, some of which capture endorsements from querying clients, can be implemented in a more efficient manner. In conventional systems, for example, querying clients would need to be authenticated and authorized as a user of the DDBMS system with edit capabilities. Maintaining this type of non-peer client access would be difficult for the same reasons given elsewhere herein for the peers in a conventional system. These problems are avoided in embodiments of the disclosure, however, by requiring client acceptance of a queried value to be entered into the permissioned (e.g., blockchain) ledger.

While a DDBMS may be truly decentralized wherein each peer contains a separate copy of the database, embodiments of this disclosure provide a DDBMS storing a distributed ledger that is endorsed and modified by a set of peer nodes participating in a consensus-based environment to create verifiability and immutability of interactions posted within the ledger.

A DDBMS comprises computational and storage elements spread across a network of peers. Typically, consensus mechanisms have to be developed to allow a consistent view of the data being stored. A distributed ledger is a special type of DDBMS where a full or partial copy of a ledger exists with every peer and a combination of secure transactions allow for copies to be kept in sync. Consensus may not be a necessary property of such a ledger. A Bitcoin system is a specialized type of DDBMS exhibiting properties of byzantine-fault tolerance, ability to audit changes, and immutability along with others.

Embodiments of the disclosure provide a type of DDBMS in which a closed network of peers (unlike Bitcoin) that are joined via cryptographic exchanges and consensus mechanisms act upon a ledger of valuation data which is kept immutable. While a full or partial copy of the distributed ledger may be maintained by each peer in this closed network, embodiments of the disclosure ensure consistency and immutability of the data stored in the ledger by implementing a sequence of steps to allow a peer to join the network (e.g., by invitation only), peer endorsement for joining of other peers, and consensus-based updates/inserts to the ledger.

Furthermore, according to embodiments of the disclosure, any access of data in such a ledger by a client is followed by an acceptance mechanism which allows the client to become a participant in the update of this ledger even though the client may not be an endorsing peer within this closed network. In embodiments of the disclosure, a combination of service modules, encryption engine, request processing engine and blockchain algorithms hosted in a service platform provide the ecosystem for this modified DDBMS to be operational in the manner desired. Scripts and templates allow the service platform to be configured without manual coding, and extended as the need for more services arise.

Embodiments of the disclosure provide systems, methods and non-transitory computer-readable media storing instructions for providing an endorsed value in a (key, value) data structure in a permissioned ledger in a distributed database management system (DDBMS) in a network. Embodiments maintain a permissioned ledger in the DDBMS, wherein a peer requires permission to access the ledger. The ledger comprises valuation entries, each comprising a key and at least one value. In embodiments of the disclosure, the ledger maintains a record of digital transactions, wherein each digital transaction record may only be appended to the ledger. The ledger may be implemented as a sequential transaction database. In embodiments of the disclosure, each peer node of a plurality of peer nodes maintains at least a portion of a replica of the ledger.

Figure 1:
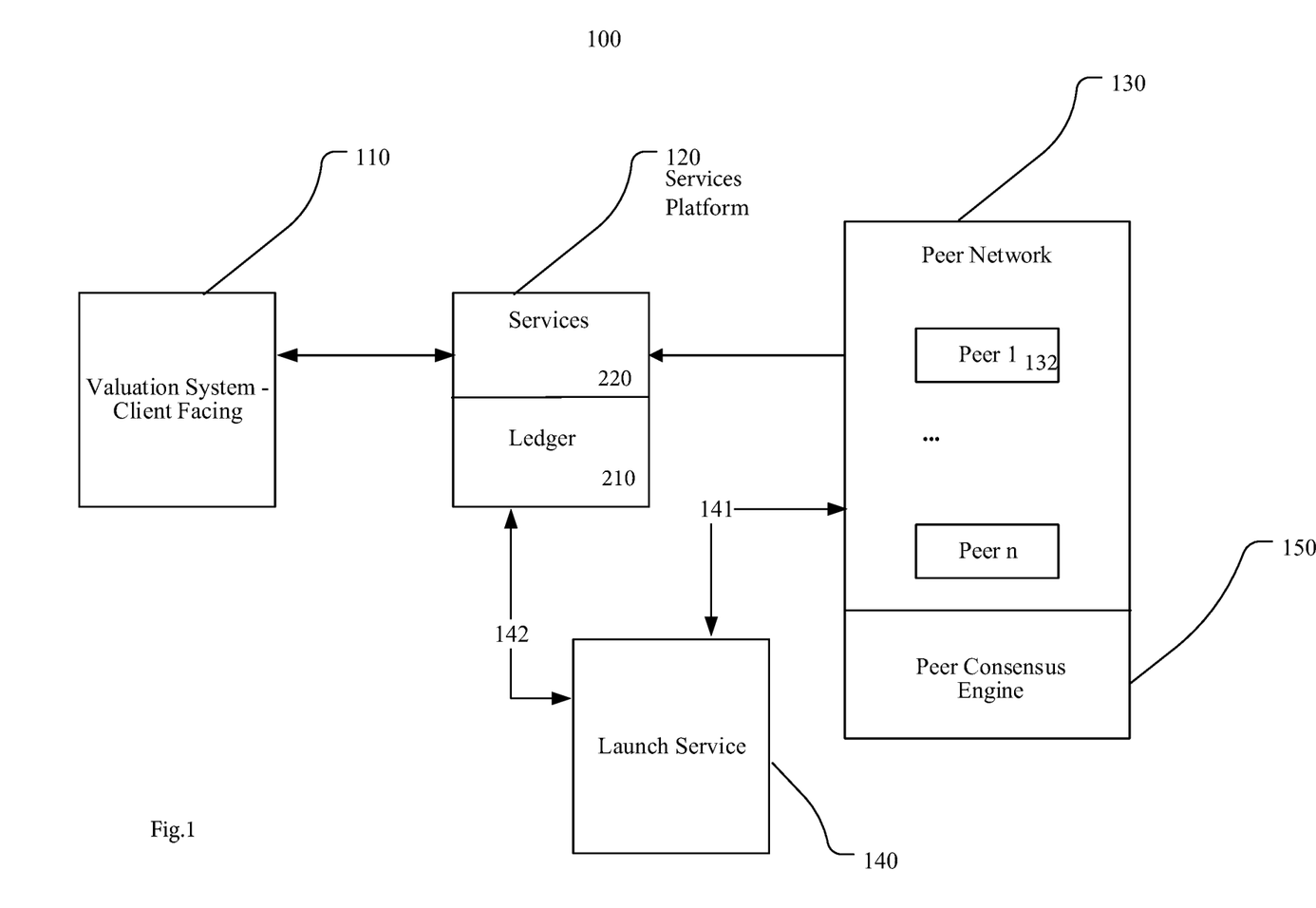
FIG. 1 illustrates a secure valuation system, according to embodiments of the disclosure.

FIG. 1 illustrates a secure valuation system 100, according to embodiments of the disclosure. A front-end system 110 (client node) may be accessed by clients via an interface, such as a browser, to allow the clients to interact with a secure valuation services platform 120 to access or request valuation data for an object, such as real estate. A peer network 130 comprises a plurality of endorsing peer nodes (e.g., peer node 132). A peer consensus engine 150 performs consensus operations, as described in detail elsewhere herein according to embodiments of the disclosure.

The client node and each peer node may include a computing device, including one or more processors and one or memories storing instructions for execution by the one or more processors at each node.

A launch service engine 140 initiates creation of the peer network 130, as described in detail elsewhere herein according to embodiments of the disclosure.

Figure 2:
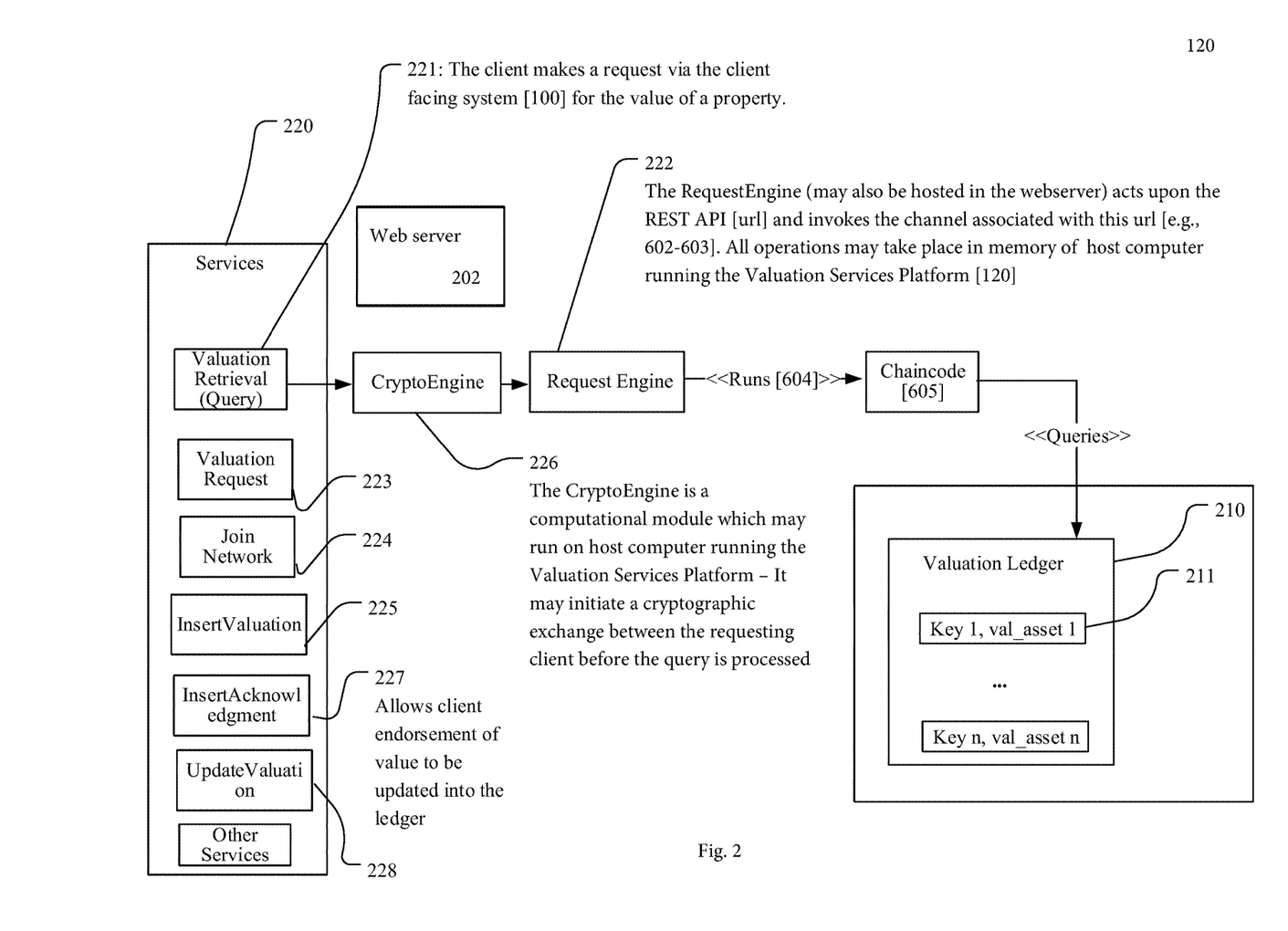
FIG. 2 illustrates the services platform 120 in detail, according to embodiments of the disclosure.

According to embodiments of the disclosure, the services platform 120 provides an immutable ledger 210 of transactions for recording the timing and changes in value of the object, and a service layer 220 to perform operations with respect to the ledger 210. The ledger 210 may include one or more processors to maintain the storage of values in the ledger.

The distributed ledger (DL) along with mechanisms to ensure consensus and secure, immutable storage are included in a distributed database management system (DDBMS), according to embodiments of the disclosure. Being a closed network of endorsing peers, this ledger is not completely decentralized, instead its replicas exist exclusively within bounds of the approved peers of the valuation network. Consensus protocols along with cryptographic exchanges allow for sequencing and securing the entries in the ledger.

FIG. 2 illustrates the services platform 120 in further detail, according to embodiments of the disclosure. The services platform 120 includes a web server 202, services layer 220 and valuation ledger 210, as well as a cryptoengine 226 (aka "CryptoEngine"), a request engine 222 (aka "RequestEngine"), and chaincode 605.

Services layer 220 include various service modules, including valuation retrieval (query) module 221, valuation request module 223, join network module 224, insert valuation module 224, insert acknowledgement module 227, update valuation module 228 as well as other service modules. Each module includes software for performing one or more services. In some cases, the term "module" and "service" may be used interchangeably herein. In embodiments, the web server 202 may execute the services in the services layer 220.

Those skilled in the art will recognize that the various engines (e.g., cryptoengine 226, request engine 222) within services platform 120, as well as launch service engine 140, may each be separately implemented using one or more processors and one or memories storing instructions for execution by the one or more processors, or various combinations of such engines may share the same processor(s) and memor(ies). In embodiments, the web server 202 may execute the services in the services layer 220 and include the crypto engine 226 and the request engine 222, as well as chaincode 605.

According to embodiments, the platform 120, via the chaincode 605, only allows the information concerning transactions to be appended to the ledger 210, using cryptographic techniques that effectively guarantee that once a transaction has been added to the ledger it cannot be modified. This property of immutability makes it simple to determine the provenance of information because participants can be sure that information has not been changed after the fact. The ledger 210 may be based on the blockchain protocol. (In the remainder of this disclosure, "blockchain" may refer to any open source or commercial implementation of the blockchain protocol with a private or permissioned ledger.) Embodiments of the disclosure employ the Hyperledger Fabric implementation, although other distributed ledger solutions may be employed.

Hyperledger Fabric is a blockchain project within the Hyperledger project founded by The Linux Foundation. Like other blockchain technologies, it has a ledger, uses smart contracts, and is a system by which participants manage their transactions. Hyperledger Fabric differs from some other blockchain systems in that it is private and permissioned. Rather than an open, permissionless system that allows unknown identities to participate in the network (requiring protocols like proof of work to validate transactions and secure the network), Hyperledger Fabric network enrolls members through a trusted Membership Service Provider (MSP) (e.g., the valuation services provider or the administrator (aka network manager) in embodiments of the disclosure). Hyperledger Fabric provides an elastic and extensible architecture.

Hyperledger Fabric also offers the ability to create channels, allowing a group of participants to create a separate ledger of transactions. If two participants form a channel, then those participants—and no others—have copies of the ledger for that channel.

In embodiments of the disclosure, transactions must be written to the ledger in the order in which they occur, even though they might be between different sets of participants within the network. For this to happen, the order of transactions must be established and a method for rejecting bad transactions that have been inserted into the ledger in error (or maliciously) must be put into place. PBFT (Practical Byzantine Fault Tolerance) can provide a mechanism for file replicas to communicate with each other to keep each copy consistent, even in the event of corruption. Alternatively, in bitcoin, ordering happens through a process called mining where competing computers race to solve a cryptographic puzzle that defines the order that all processes subsequently build upon.

Hyperledger Fabric has been designed to allow network creators to choose a consensus mechanism that best represents the relationships that exist between participants. As with privacy, there is a spectrum of needs; from networks that are highly structured in their relationships to those that are more peer-to-peer. Hyperledger Fabric consensus mechanisms include SOLO and Kafka, for example. Hyperledger Fabric smart contracts are written in chaincode and are invoked by an application external to the blockchain when that application needs to interact with the ledger. In most cases, chaincode interacts only with the database component of the ledger.

In embodiments, the services platform 120 requires consensus on the value of the object by peer nodes. In embodiments, the peer nodes may participate in the consensus process only if they are invited by the administrator ("admin") of the services platform 120. In embodiments, the administrator may be the provider of the valuation of the object.

Figure 3:
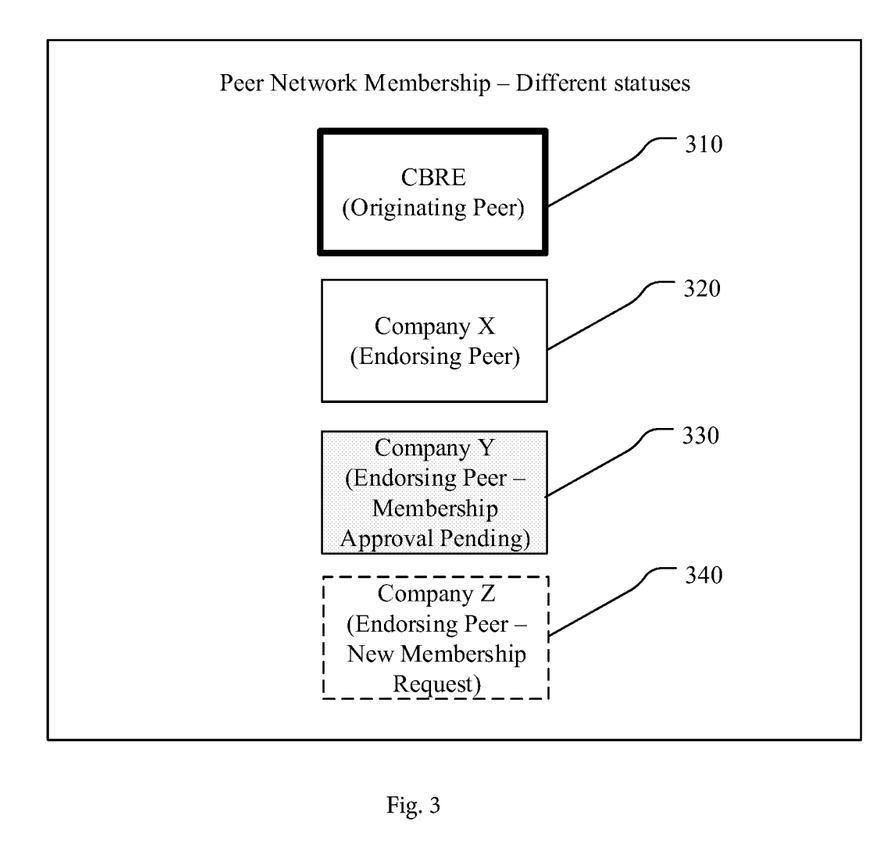
FIG. 3 illustrates different statuses of peer network membership, according to embodiments of the disclosure.

In embodiments, the admin may first establish a secure network with only one party, e.g., the object valuation provider. Using the blockchain protocol in the Hyperledger Fabric, the admin uses the launch service engine 140 first establishes a secure network 130 with the computing node of only one party, which thereby becomes a peer node. Referring to FIG. 3, the first peer node is known as the "originating peer node" 310, which is also an endorsing peer permitted to participate in the consensus protocol applied to candidate valuations, as described elsewhere herein. The admin may then add to the network 130 other endorsing peer nodes, such as 320. The endorsing peers corresponding to the endorsing peer nodes may also be clients of the object valuation provider. In embodiments, the admin may be the same entity that operates as the valuation provider.

As an alternative to the admin adding peers beyond the first and second endorsing peers, the peer consensus engine 150 may subject all other candidates for peer status to a peer acceptance algorithm involving a traditional cryptographic exchange. The peer consensus engine 150 may require a consensus among the first and second existing peer nodes 310 and 320 to admit new endorsing peer nodes to the network 130. Until then, peer consensus engine 150 may keep the candidate node 330 membership in a pending status and consensus for valuation requests (described elsewhere herein) will not include this peer node. The peer consensus engine 150 may allow a new membership request on a case by case basis. The peer consensus engine may employ the Hyperledger consensus algorithm. The peer consensus engine 150 may run on a host computer associated with the peer network 130. A result of the consensus may be inserted into the ledger 210.

As an alternative to a consensus for new peer acceptance, the peer consensus engine 150 may employ a peer invitation protocol using established cryptographic techniques including a private, public key pair setup. The protocol allows financial institutions and others accessing similar valuation data to enter the valuation provider's valuation network 130. Establishment and exit from the network may use a blockchain smart contract implementation with entry and exit clauses.

The launch service 140 may exist outside the services platform 120. It may be invoked by the network administrator once. It performs the following initiation tasks:

The admin may invoke (141) the underlying Hyperledger fabric to create the network. Initially there is one peer—the originating peer of the network. Subsequent additions to the network may follow a consensus protocol.

According to embodiments of the disclosure, a new addition to the network (peer1 in this example) may be triggered via a JoinNetwork 224 request API from the services layer 220:

```
Name: JoinNetwork
URL:https://valservice.cbre.com/valuations/network/join
Description:
OPERATION: POST
{
peerinfo: {
    peerid: 'peer1',
    org: 'CBRE',
    domain : 'val.cbre.com'
    }
}
```

To add the second peer to the network, the consensus protocol is skipped because the only validating peer in the network is the originating peer. After this point, any other additions will require implementation of a consensus protocol by the active peers in the network, according to embodiments of the disclosure.

The admin initializes and configures (142) the services platform 120 via an initiation script to execute templates which set up the initial set of services in the platform. An initial set includes services such as:
JoinNetwork 224
ValuationRequest 223
InsertValuation225
UpdateValuation228
ValuationRetrieval 221

The services platform 120 may host the set of service modules 220 in the web server 202.

Figure 6:
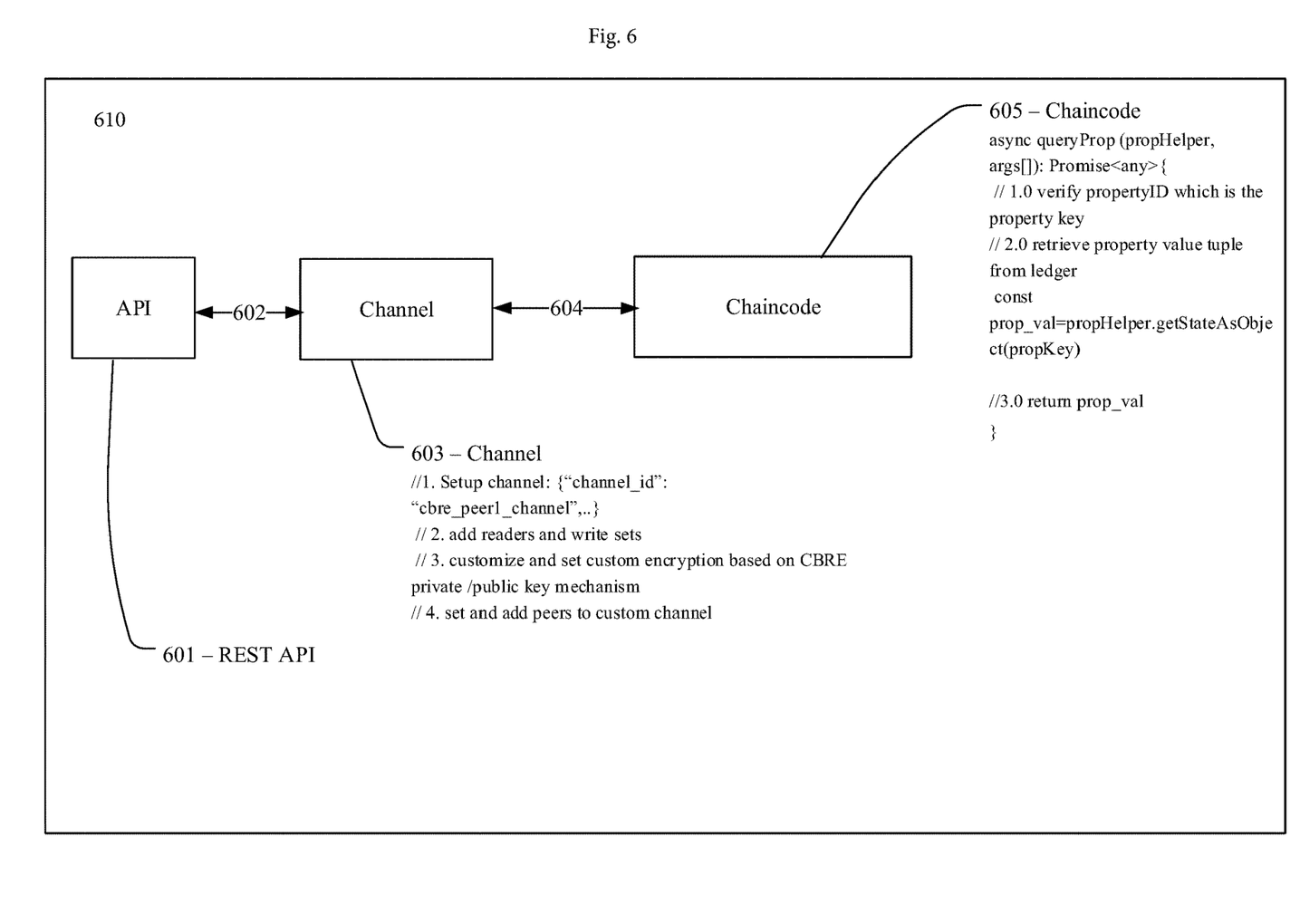
FIG. 6 illustrates an example of the setup of valuation services with API/channel/chaincode, according to embodiments of the disclosure.

Each Service is a logical combination of an API endpoint, a channel and chaincode, as shown in FIG. 6. As noted elsewhere, the web server may also host cryptoengine 226 and request engine 222. The web server and the engines are initialized during this step with an initial compute power and memory capacity that can be automatically scaled horizontally and vertically as the need arises.

The admin, using the launch service 140, may initialize (142) the ledger 210 which will eventually be populated with valuation data (and associated metadata).

Valuation Asset

In an example of the valuation of a real estate object, the valuation asset may be represented in tuples 211 of the form:
{m, ex, ix, fl, ux, var'} m: Market Value
ex: External Area
ix: Internal Area
fl: Floors
ux: Total usable area
var': Allows additional imperative or descriptive fields (text or tuple) to represent valuation asset The valuation asset may be stored in a data block (e.g., data file) in the ledger, along with at least one cryptographic link to one or more previous data blocks in the ledger.

Valuation Private Ledger

The admin may establish a permissioned, e.g., private, ledger 210 recording an immutable sequence of events in the valuation data store 120. The ledger 210 may store records of transactions representing creation, updates, and versions of valuation data. The ledger 210 may be queried by clients with appropriate permissions established after standard cryptographic handshakes. Such clients may be customers of the valuation provider. This ledger also may store a valuation history of the property.

Interactions and Services: Channel, Chaincode, API

Using, e.g., the Hyperledger Fabric, the launch service engine 140 may create secure channels 603 in the blockchain framework that allows multiple peer nodes to receive broadcast messages 602. A message 602 will occur due to an interaction between a client node (e.g., client facing frontend 110) and a service API 601. As described elsewhere herein, services layer 220 provides service modules, such as valuation request 223 and peer invitation (join network) 224, to facilitate operations and updates. Each service module may have two main components:

1. Chaincode 605: logic to handle the request placed by the client via the service API 601. This logic may, for example, query the ledger or update it. It may also spin up an interaction with another API, thus "chaining" a sequence of events to yield the outcomes of the service.

2. REST API 601: a REST-based API specification to provide access to perform requested operations. The web server 202 within the services platform 120 reacts to the API invocation from the client facing system 110. Based on the API 601 endpoint (url), the web server 202 activates the corresponding service module in services 220. This module will first invoke the CryptoEngine 226. After verification, control is passed to the RequestEngine 222 to act upon the request by parsing the payload of the request and invoking the chaincode over the channel corresponding to that service.

In Hyperledger Fabric, chaincode is a program that implements a prescribed interface. Chaincode runs in a secured Docker container isolated from the endorsing peer process. Chaincode initializes and manages the ledger state through transactions submitted by applications.

A chaincode typically handles logic agreed to by members of an enterprise network; it is similar to a "smart contract." The chaincode may determine how data can be created, stored and changed, and how it is routed to software and people. Given the appropriate permission, a chaincode may invoke another chaincode to access its state within the same network.

FIG. 6 illustrates an example of the setup of valuation services by configuring the API/channel/chaincode. The general concept behind this example is applicable to the other services described herein. A service is a logical combination of a REST API endpoint 601 (e.g., valuation request 223), a Channel 603 and a Chaincode 605. The Chaincode logic 605 interacts with the ledger 210 containing property valuation data.

The channel 603 that has been setup is between the client (that invokes the API) and the peers in the valuation network. The launch service 140 contains initialization scripts to set up the channel(s) 603 with a unique ID that corresponds to the service(s) provided. The scripts configure the channel 603 with details concerning which peers can read or write to the channel, giving some peers more privileges than others. The scripts also configure the channel 603 with appropriate security certificates and encryption to secure the communication within them. The web server 202, while acting upon a REST API request, may activate the appropriate service module to add peers to the channel 603 depending on how the request will be executed, e.g., whether a particular peer is needed at a particular point during a transaction.

The chaincode 605 includes logic to satisfy the client's request. In this example, the chaincode 605 verifies the ID of the property for which the valuation is being referenced in the ledger. The ID may serve as the key with which data is retrieved from the ledger. The chaincode step retrieves from the ledger any recent interactions (changes in key, value data) for the property and then filters further on what the service is requesting. Subsequent APIs will note this information interchange and add back the history of the transaction (e.g., endorsements, updates) to the ledger. Other interactions (such as those in 221) will have similar API/Channel/Chaincode combinations Conventionally, channel configurations and chain code logic in Hyperledger need to be manually coded to enable access by particular users to particular services with respect to accessing a ledger. According to embodiments of the disclosure, the setup of templates for API calls for a variety of services reduces the need to manually code API definitions, channel configurations and chaincode logic. By using these scripted templates, the user need only provide parameters such as the property address.

Valuation Request Service 223

Figure 4:
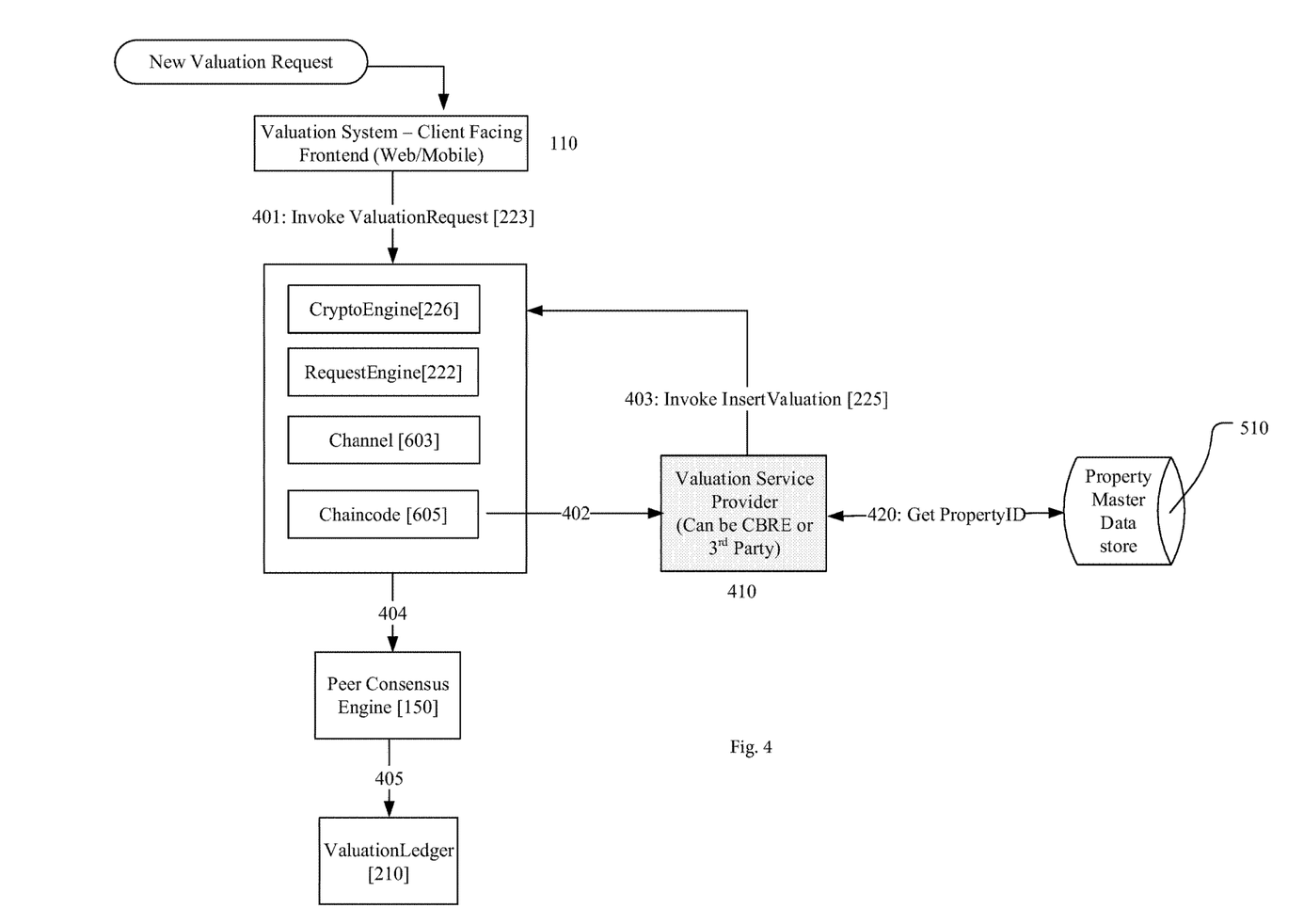
FIG. 4 illustrates the interactions involved in fulfilling a valuation request, according to embodiments of the disclosure.

A valuation request is a request to have a valuation of a property, as contrasted, for example, with a query to obtain the stored value of a property. The actual value of a property is determined by using a provider 410 of a valuation service, according to embodiments of the disclosure. The secure network solicits the services of such a provider. The provider may reside at a peer node, including the originating peer node. Once the provider is ready to submit a valuation, the peers in the secure network may follow a consensus protocol to submit the valuation, which is committed to the ledger.

The valuation data is submitted to the valuation network using the secure valuation channel, configured chaincode, and exposed API. The valuation data is simultaneously propagated to peers in the network for endorsement. According to embodiments of the disclosure, the interactions are described in detail below and illustrated in FIG. 4:

Using the client facing valuation system 110, a client posts a new request, including a property address, for getting a valuation done for a property, causing the web server 202 to invoke valuation request module 223 (401).

The valuation request service 223 invokes a valuation services provider 410 (402). The term "valuation services provider" may refer to an engine that includes hardware and software for providing valuation services, or to the entity running the valuation services provider engine, for example.

Figure 5:
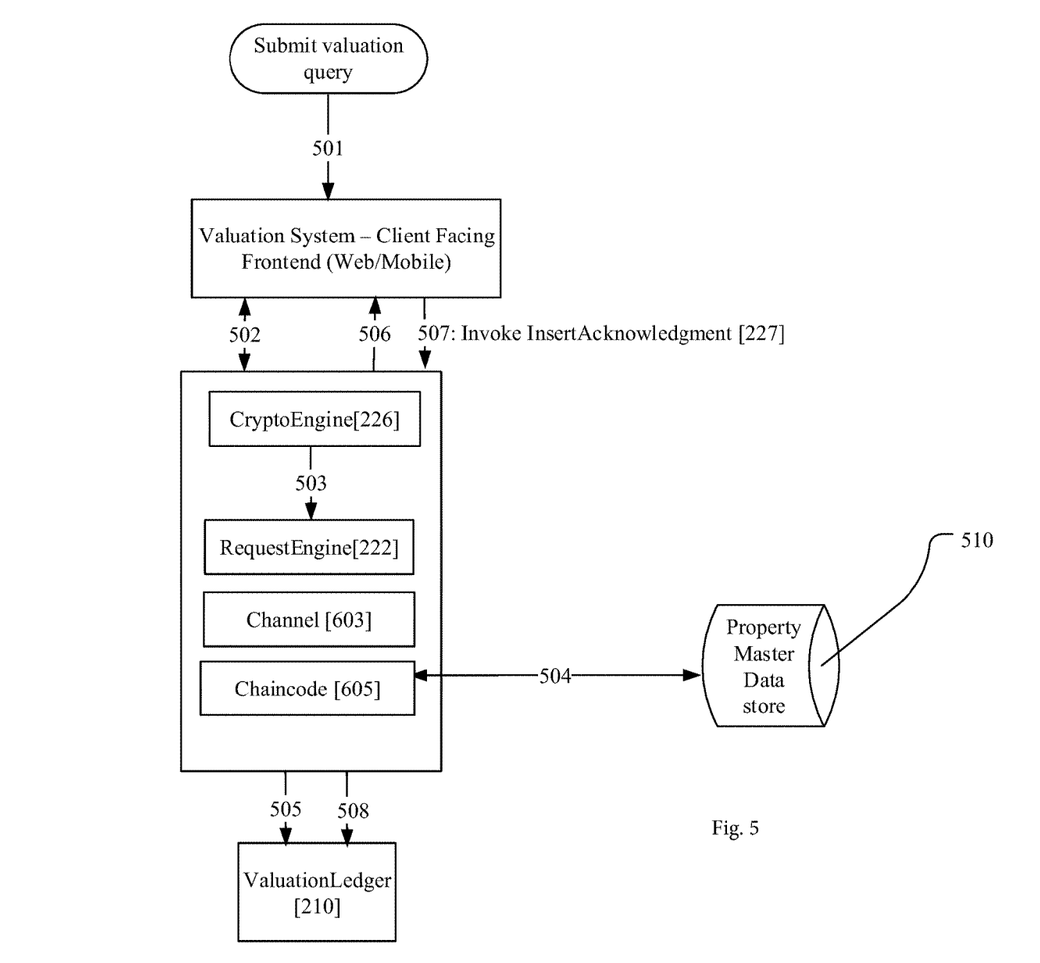
FIG. 5 illustrates the interactions involved in fulfilling a valuation query, according to embodiments of the disclosure.

The valuation services provider 410 may retrieve the unique property ID for the property address after an address validation step using a property master data store 510 (420). The property master data 510 may include a lookup table associating property address with property ID.

The valuation services provider 410 uses a valuation algorithm to produce a candidate property value (403). The valuation algorithm may be well-known or proprietary. The provider 410 causes the services engine 220 to submit the candidate property value back to the peer network 130 using the InsertValuation request 225.

The peer consensus engine 150 runs a peer consensus algorithm to gather a consensus on the submitted, candidate value (404). In embodiments, the consensus algorithm may require unanimity, a majority, or a supermajority among peer nodes. The algorithm may require multiple iterations to achieve consensus. According to embodiments of the disclosure, the system may include a limit on the number of iterations. After the iteration limit is reached, any deadlock may be resolved by the originating peer of the network 310, or through a different process. The system may store the number of iterations in the var' field in the valuation asset tuple.

Upon consensus, the peer consensus engine 150 may provide to the services layer 220 the now endorsed valuation asset tuple. In response, the web server 202, using chaincode logic 605, updates the valuation ledger 210 with a new tuple (405) (pursuant to the InsertValuation request 225), thereby forming an immutable footprint of the valuation exercise. According to embodiments of the disclosure, any changes or updates must go through a similar consensus process.

Below is an example of an API call for a valuation request 223 for the Dallas property having property ID 11345698:

```
Name: ValuationRequest
URL: https://valservice.cbre.com/valuations/property/request-valuation
OPERATION : POST //invokes API with payload
PAYLOAD: //information passed to enable valuation provider 410 to
generate valuation
{
  propertyinfo: {
        address: '2100 Ross Avn, Floor 3, Suite 301',
        city : 'Dallas',
        zip: '75201'
    },
    requester:{
      name: 'JoeClient',
      email: 'joexxx@joeclient.com',
      ph: '111-111-1111'
      }
}
```

Key/Value

At the end of the initial valuation algorithm, the chaincode 605 commits a key/value entry 211 into the ledger 210. In embodiments, the key is a property ID which may be unique to the valuation provider and stored in a property data master store 210. The value in the key/value pair is the val_asset value. Thus, the chaincode 605 stores an entry of the form {k, val_asset} in the ledger as the first endorsed value of a property.

Loading Existing Valuation Data

In addition to creating a first valuation of a property, existing valuations may be stored. In embodiments, the system puts added data through the same peer consensus protocol as the initial data created by a valuation services provider before allowing the existing valuation data to be added to a ledger.

Existing valuation data needs to be presented to the secure network in the same manner as new valuation data. This means it has to go through the same peer endorsement procedure. The data may be stored in property master data store 510 or another store. An application acting on behalf of each store to consume data from such store and submit to the secure valuation network becomes a client to the secure network, and the only data added to the valuation private ledger may be peer-endorsed valuation data. Existing valuation data uses a Channel/Chaincode/API combination, triggered by the insert valuation 225 API call.

An example of using the insert valuation 225 API call to add a valuation of $555,000 for a property in Dallas, Tex. having property ID 11345698 is given below:

```
Name: InsertValuation
URL:https://valservice.cbre.com/valuations/property/create-propertyval
OPERATION : PUT
{
  meta: {
     propertyid: '11345698',
     assessedvalue: '550,000',
     appraiser: 'AppraiserCBRE01'
     },
  valuationdata: {
        propertyid: '11345698',
        address: '2100 Ross Avn',
        city : 'Dallas',
        zip: '75201',
        assessedvalue: '550 ,000',
        appraiser: 'AppraiserCBRE01',
        currentuse : 'office',
        actualage: '50years',
        netrentablearea: '275sqft',
        pricepersqft: '2000'
        }
}
```

Updates

In embodiments of the disclosure, a client that was not the originator of the initial valuation asset entry in the ledger may propose an update to it. The system may put the proposed updated data through the same peer consensus protocol as the initial data created by a valuation services provider before allowing the updated valuation data to be added to a ledger. Note that the update does not allow existing blocks storing the original valuation asset to be changed. Rather, a new block may be added with an updated valuation asset.

Updates to property valuation data will be a common interaction which is surfaced using the same Channel/Chaincode/API concept described above. Updates may be done by a client that was not the originator of the initial value entry in the ledger. A peer consensus protocol may ensure that the updated value is endorsed by all participating entities in the secure network. An example of an API call for the update valuation service 228 used to update the value of the same Dallas property, having property ID 11345698, to $576,050 is given below:

```
Name: UpdateValuation
URL: https://valservice.cbre.com/valuations/property/update-propertyval
Description
OPERATION : POST
{
  meta: {
     propertyid: '11345698',
     assessedvalue: "576,050',
     appraiser: 'AppraiserCBRE01'
     },
  valuationdata: {
        propertyid: '11345698',
        assessedvalue: "576,050',
        appraiser: 'AppraiserCBRE03',
        currentuse : 'office',
        actualage: '50years',
        netrentablearea: '2050sqft',
```

```
        pricepersqft: '281'
    }
}
```

Deletes

According to embodiments of the disclosure, the ledger will not delete an existing value. Instead, the update valuation service 228 may equivalently update the valuation as invalid so that the latest transaction in the ledger related to a property will be of form {k, invalid} where k is the property ID. According to embodiments of the disclosure, this update may follow a consensus process, or, if, for example, the entire network is majority owned by the valuation provider, the valuation provider may invalidate the property.

Valuation Retrieval (Query) Service 221

According embodiments of the disclosure, one advantage of the secure network is the ability to provide a peer-endorsed valuation asset derived from an immutable private ledger. The query service allows any client to access the valuation network in a read-only fashion using the API/Channel/Chaincode access to retrieve the value of a property. FIG. 5 (with reference to FIG. 2) illustrates the interactions for this purpose, according to embodiments of the disclosure.

Using the client facing valuation system 110, the client submits a query to retrieve the value of a property, having a specified address, from the ledger 210 (501). In response, the client facing valuation system 110 places a request (valuation retrieval (query) service 221) to the services layer 220. Web server 202 receives the query request.

Web server 202 activates the service module (221) corresponding to this request which in turn initiates a cryptographic exchange between the requesting client and the services platform 120 (502). The CryptoEngine 226, which may also run in the web server 202, performs these steps. The client verification may include conventional cryptographic key exchange protocols.

After verification, the CryptoEngine 226 passes control to the RequestEngine 222 to satisfy the request 221 for valuation retrieval (503). The RequestEngine 222 in turn invokes the Channel 603 and Chaincode 605 corresponding to the query request service 221.

According to embodiments of the disclosure, the web server 202 running the chaincode logic 605 sends a request to property master data source 510 to retrieve the master property ID (504).

The web server 202 running the chaincode logic 605 queries the valuation ledger 210 with the unique property ID to retrieve the valuation asset tuple (505). Tuples indicating versions may allow display of property valuation history based on which key performance indicators can be displayed.

The web server 202 running the chaincode logic 605 packages the valuation data in tuples into a readable format for presentation to the client (506)

To mitigate future litigation based on disputes of a property value, each time a client queries and receives a property value, the web server 202 may require the client frontend 110 to invoke an InsertAcknowledgment service 227 to request that the requesting client accept (i.e., endorse) the returned property value (507). Upon acceptance, the web server 202 running the insert acknowledgement service 227 enters into the ledger 210 the accept (InsertAcknowledgement) transaction 508 representing the client's acceptance (508).

In this case, the key/value asset entered into the ledger may be of the following form:
   {Client_ID, {k, val_asset} }, where,
   Client_ID: Unique ID of the client in the system
   k: The unique property ID
   val_asset: The tuple representing the valuation asset. This can also contain encrypted, digitized documents showing support for the valuation exercise.

In the same manner, the insert acknowledgement service 227 may request the client to endorse other values within the valuation asset, and store that accept transaction with those values into the ledger (508).

Figure 7:
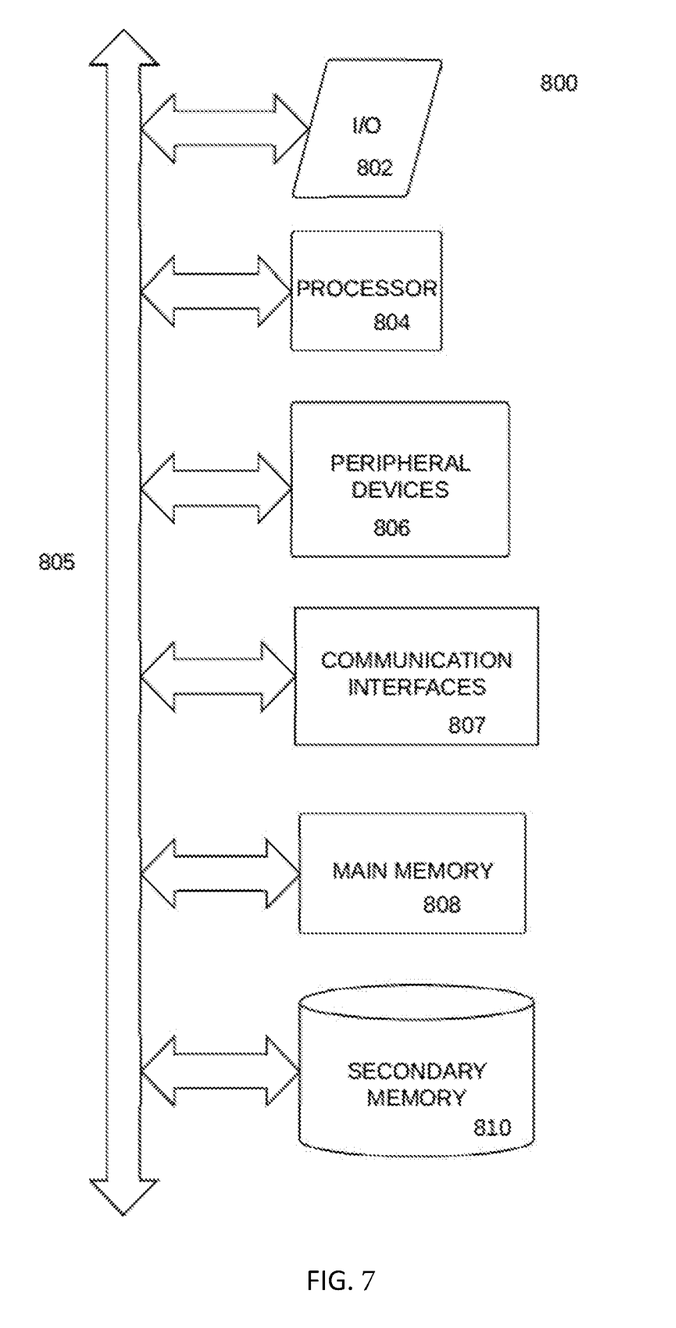
FIG. 7 illustrates an example of a computer system that may be used to execute program code stored in a non-transitory computer readable medium in accordance with embodiments of the disclosure

FIG. 7 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users and/or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Elements of embodiments of the disclosure, such as the web server 202, the cryptoengine 226, the request engine 222, and the ledger 210 may each be separately implemented with a computer system or cluster of computer systems or implemented in different combinations on one or more computer systems, such as that of computer system 800. Similarly, each peer node and the peer consensus engine 150 may employ one or more computer systems, such as that of computer system 800.

Program code may be stored in non-transitory computer-readable media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include specialized processing units (e.g., GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. Some elements and functionality may be implemented locally and others may be implemented in a distributed fashion over a network through different servers, e.g., in client-server fashion, for example. In particular, server-side operations may be made available to multiple clients in a software as a service (SaaS) fashion.

Those skilled in the art will understand that some or all of the elements of embodiments of the disclosure, and their accompanying operations, may be implemented wholly or partially by one or more computer systems including one or more processors and one or more memory systems. In particular, the elements of valuation system and any other automated systems or devices described herein may be computer-implemented. Some elements and functionality may be implemented locally and others may be implemented in a distributed fashion over a network through different servers, e.g., in client-server fashion, for example. In particular, server-side operations may be made available to multiple clients in a software as a service (SaaS) fashion.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

What is claimed is:

1. A computer-implemented method for providing an endorsed value in a permissioned ledger in a distributed database management system (DDBMS) in a network, the method comprising:
   a. providing a permissioned ledger in the DDBMS, the ledger comprising valuation entries, each comprising a key and at least one value,
      i. wherein permission is required for a peer node of a plurality of peer nodes to access the ledger,
      ii. the ledger maintains a record of digital transactions, wherein the digital transactions may be appended to the ledger, but not modified within the ledger, and
      iii. each peer node of the plurality of peer nodes maintains at least a portion of a replica of the ledger;
   b. receiving, by a computing device, a request for valuation of a physical object, wherein the physical object is identified by an object identifier;
   c. obtaining, by a computing device, a candidate object value of the object;
   d. obtaining, by a computing device, an endorsed object value of the object based at least in part upon implementation of a consensus protocol among peer nodes in the network concerning the candidate object value; and
   e. adding, by a computing device, to the ledger a data block including the endorsed object value, wherein the added data block is cryptographically linked to a previous data block in the ledger.

2. The method of claim 1, further comprising providing service templates to enable different types of interactions with the ledger.

3. The method of claim 1, wherein the ledger is implemented using blockchain.

4. The method of claim 1, wherein the identifier comprises a public key.

5. The method of claim 1, wherein implementing a consensus protocol comprises, if a consensus is not reached among the peer nodes, an originating peer node determining the endorsed object value, wherein the originating peer node is the first node in the network to provide an initial candidate value of the object.

6. The method of claim 5, wherein the originating peer node determines the endorsed object value if a consensus is not reached among the peer nodes after a threshold number of iterations.

7. The method of claim 1, further comprising:
   a. receiving, by a computing device, from a requesting client node a query for an endorsed object value of a first object;
   b. providing to the requesting client node the requested endorsed object value;
   c. receiving from the requesting client node a requestor endorsement of the requested endorsed object value; and
   d. associating, in the permissioned ledger, the requestor endorsement with the first object.

8. The method of claim 7, wherein the requesting client node is not a peer node permitted to participate in the consensus protocol.

9. The method of claim 1, wherein the peer nodes are allowed to participate in the consensus protocol by invitation only.

10. The method of claim 1, wherein the object is real property, and the endorsed object value is a valuation of the real property.

11. The method of claim 1, wherein the added data block is cryptographically linked to a previous data block in the ledger by including a hash of the previous data block.

12. The method of claim 1, further comprising establishing a channel of a plurality of channels between a client node and a set of the peer nodes, wherein each channel corresponds to a service and to access privileges that peer nodes have with respect to the ledger via the channel.

13. A system for providing an endorsed value in a permissioned ledger in a distributed database management system (DDBMS) in a network, the system comprising:
   one or more memories storing instructions;
   one or more processors coupled to at least one of the one or more memories for executing instructions to cause the system to:
      a. provide a permissioned ledger in the DDBMS, the ledger comprising valuation entries, each comprising a key and at least one value,
         i. wherein permission is required for a peer node of a plurality of peer nodes to access the ledger,
         ii. the ledger maintains a record of digital transactions, wherein the digital transactions may be appended to the ledger, but not modified within the ledger, and
         iii. each peer node of the plurality of peer nodes maintains at least a portion of a replica of the ledger;
      b. receive a request for valuation of a physical object, wherein the physical object is identified by an object identifier;
      c. obtain a candidate object value of the object;
      d. obtain an endorsed object value of the object based at least in part upon implementation of a consensus protocol among peer nodes in the network concerning the candidate object value; and
      e. add to the ledger a data block including the endorsed object value, wherein the added data block is cryptographically linked to a previous data block in the ledger.

14. The system of claim 13, further comprising service templates for enabling interaction with the ledger.

15. The system of claim 13, wherein the ledger is implemented using blockchain.

16. The system of claim 13, wherein the identifier comprises a public key.

17. The system of claim 13, wherein the implementation of a consensus protocol comprises, if a consensus is not reached among the peer nodes, an originating peer node determining the endorsed object value, wherein the originating peer node is the first node in the network to provide an initial candidate value of the object.

18. The system of claim 17, wherein the originating peer node determines the endorsed object value if a consensus is not reached among the peer nodes after a threshold number of iterations.

19. The system of claim 13, at least one of the one or more memories storing at least one instruction to cause the system to:
   a. receive from a requesting client node a query for an endorsed object value of a first object;
   b. provide to the requesting client node the requested endorsed object value;
   c. receive from the requesting client node a requestor endorsement of the requested endorsed object value; and
   d. associate, in the permissioned ledger, the requestor endorsement with the first object.

20. The system of claim 19, wherein the requesting client node is not a peer node permitted to participate in the consensus protocol.

21. The system of claim 13, wherein the peer nodes are allowed to participate in the consensus protocol by invitation only.

22. The system of claim 13, wherein the object is real property, and the endorsed object value is a valuation of the real property.

23. The system of claim 13, wherein the added data block is cryptographically linked to a previous data block in the ledger by including a hash of the previous data block.

24. The system of claim 13, at least one of the one or more memories storing at least one instruction to cause the system to establish a channel of a plurality of channels between a client node and a set of the peer nodes, wherein each channel corresponds to a service and to access privileges that peer nodes have with respect to the ledger via the channel.

25. One or more non-transitory computer-readable media storing instructions for providing an endorsed value in a permissioned ledger in a distributed database management system (DDBMS) in a network, wherein the instructions, when executed by one or more computing devices, cause at least one of the one or more computing devices to:
   a. provide a permissioned ledger in the DDBMS, the ledger comprising valuation entries, each comprising a key and at least one value,
      i. wherein permission is required for a peer node of a plurality of peer nodes to access the ledger,
      ii. the ledger maintains a record of digital transactions, wherein the digital transactions may be appended to the ledger, but not modified within the ledger, and
      iii. each peer node of the plurality of peer nodes maintains at least a portion of a replica of the ledger;
   b. receive a request for valuation of a physical object, wherein the physical object is identified by an object identifier;
   c. obtain a candidate object value of the object;
   d. obtain an endorsed object value of the object based at least in part upon implementation of a consensus protocol among peer nodes in the network concerning the candidate object value; and
   e. add to the ledger a data block including the endorsed object value, wherein the added data block is cryptographically linked to a previous data block in the ledger.

26. The one or more non-transitory computer-readable media of claim 25, storing at least one instruction that, when executed by one or more computing devices, causes at least one of the one or more computing devices to execute a service template to interact with the ledger.

27. The one or more non-transitory computer-readable media of claim 25, wherein the ledger is implemented using blockchain.

28. The one or more non-transitory computer-readable media of claim 25, wherein the identifier comprises a public key.

29. The one or more non-transitory computer-readable media of claim 25, wherein the implementation of a consensus protocol comprises, if a consensus is not reached among the peer nodes, an originating peer node determining the endorsed object value, wherein the originating peer node is the first node in the network to provide an initial candidate value of the object.

30. The one or more non-transitory computer-readable media of claim 29, wherein the originating peer node determines the endorsed object value if a consensus is not reached among the peer nodes after a threshold number of iterations.

31. The one or more non-transitory computer-readable media of claim 25, storing at least one instruction that, when executed by one or more computing devices, causes at least one of the one or more computing devices to:
   a. receive from a requesting client node a query for an endorsed object value of a first object;
   b. provide to the requesting client node the requested endorsed object value;
   c. receive from the requesting client node a requestor endorsement of the requested endorsed object value; and
   d. associate, in the permissioned ledger, the requestor endorsement with the first object.

32. The one or more non-transitory computer-readable media of claim 31, wherein the requesting client node is not a peer node permitted to participate in the consensus protocol.

33. The one or more non-transitory computer-readable media of claim 25, wherein the peer nodes are allowed to participate in the consensus protocol by invitation only.

34. The one or more non-transitory computer-readable media of claim 25, wherein the object is real property, and the endorsed object value is a valuation of the real property.

35. The one or more non-transitory computer-readable media of claim 25, wherein the added data block is cryptographically linked to a previous data block in the ledger by including a hash of the previous data block.

36. The one or more non-transitory computer-readable media of claim 25, storing at least one instruction that, when executed by one or more computing devices, causes at least one of the one or more computing devices to establish a channel of a plurality of channels between a client node and a set of the peer nodes, wherein each channel corresponds to a service and to access privileges that peer nodes have with respect to the ledger via the channel.

* * * * *